United States Patent [19]

Haines, Jr. et al.

[11] Patent Number: 4,487,793
[45] Date of Patent: Dec. 11, 1984

[54] VINYL COVERED SOUND ABSORBING STRUCTURE

[75] Inventors: Charles Haines, Jr.; Raymond C. Kent, both of Lancaster, Pa.

[73] Assignee: Armstrong World Industries, Inc., Lancaster, Pa.

[21] Appl. No.: 546,325

[22] Filed: Oct. 28, 1983

Related U.S. Application Data

[63] Continuation-in-part of Ser. No. 453,742, Dec. 27, 1982, abandoned.

[51] Int. Cl.³ .......................... B32B 3/24; E04B 1/84
[52] U.S. Cl. .................................. 428/136; 181/290; 181/291; 181/292; 428/137
[58] Field of Search ............... 181/290, 291, 292; 428/136, 137

[56] References Cited

U.S. PATENT DOCUMENTS

| | | | |
|---|---|---|---|
| 3,137,364 | 6/1964 | Akerton | 181/290 |
| 3,422,920 | 1/1969 | Greason et al. | 181/291 |
| 3,844,875 | 10/1974 | Chamberlain | 181/291 |
| 4,076,100 | 2/1978 | Davis | 181/290 |
| 4,097,633 | 6/1978 | Focht | 181/290 |
| 4,128,682 | 12/1978 | Nomura et al. | 181/290 |
| 4,128,683 | 12/1978 | Nomura et al. | 181/290 |
| 4,263,356 | 4/1981 | Nomura et al. | 181/290 |
| 4,294,329 | 10/1981 | Rose et al. | 181/292 |
| 4,313,524 | 2/1982 | Rose | 181/291 |
| 4,317,503 | 3/1982 | Soderquist et al. | 181/290 |

Primary Examiner—James C. Cannon

[57] ABSTRACT

A base structure of a fibrous material has on one face thereof a plurality of acoustical perforations. Positioned over this perforated face is a vinyl layer having a plurality of apertures therein, the apertures of the vinyl being in number much greater than the number of perforations in the base structure. The apertures in the vinyl sheet not all being in alignment with the perforations of the base structure, but the perforations of the base structure having a substantial number thereof in alignment with the apertures in the vinyl structure whereby an acoustical sound absorbing structure is formed.

1 Claim, 2 Drawing Figures

VINYL COVERED SOUND ABSORBING STRUCTURE

CROSS REFERENCE TO RELATED APPLICATION

This application is a continuation-in-part of U.S. application Ser. No. 453,742, filed Dec. 27, 1982, now abandoned, entitled "Vinyl Covered Sound Absorbing Structure" filed in the names of Charles Haines Jr. et al.

BACKGROUND OF THE INVENTION

The invention is directed to an acoustical structure and, more particularly, to a perforated acoustical structure with a vinyl facing.

DESCRIPTION OF THE PRIOR ART

U.S. Pat. No. 3,074,505 discloses an acoustical structure wherein a metal covered fibrous panel is pierced to form acoustical openings therein.

U.S. Pat. No. 3,137,364 is another example of an acoustical base having a coating thereover and being punched with acoustical openings.

U.S. Pat. No. 2,984,312 is directed to a two layer base structure having acoustical openings and positioned thereover a facing layer having smaller acoustical openings therein.

U.S. Pat. No. 3,422,920 discloses a vinyl covered fiberboard having a number of small acoustical openings punches therein.

U.S. Pat. No. 3,621,934 is another example of the acoustical structure having a number of small acoustical openings therein.

Finally, U.S. Pat. Nos. 3,844,875 and 3,954,540 are directed to an acoustical structure having a vinyl facing and acoustical apertures punched both in the vinyl facing and the fiberboard base. The acoustical openings in the vinyl material are smaller than the acoustical openings in the fibrous base.

SUMMARY OF THE INVENTION

The invention is directed to an acoustical structure having a base structure of fibrous material with one face thereof having a plurality of acoustical perforations therein. Positioned over the perforated face is a vinyl layer having a plurality of apertures therein. The apertures being about ¼ or less in area smaller than the acoustical perforations in the base structure. The number of perforations per square inch in the vinyl sheet being 20 or more times the number of perforations per square inch in the base structure. This results in a situation wherein a large number of the perforations in the vinyl sheet are not in alignment with perforations in the base structure, but a large number of the perforations in the base structure are in alignment with one or more perforations in the vinyl structure.

The vinyl structure may be composed of a two-part structure being a woven fabric base and a vinyl coating thereover.

The surface of the vinyl sheet may have an irregular surface whereby the perforations in the vinyl sheet are concealed within the irregularities of the irregular surface of the vinyl sheet.

BRIEF DESCRIPTION OF THE DRAWING

FIG. I is a perspective view of the invention herein, and

FIG. II is a perspective view of the apertures in the vinyl surface covering.

DESCRIPTION OF THE PREFERRED EMBODIMENT

Figure 1:
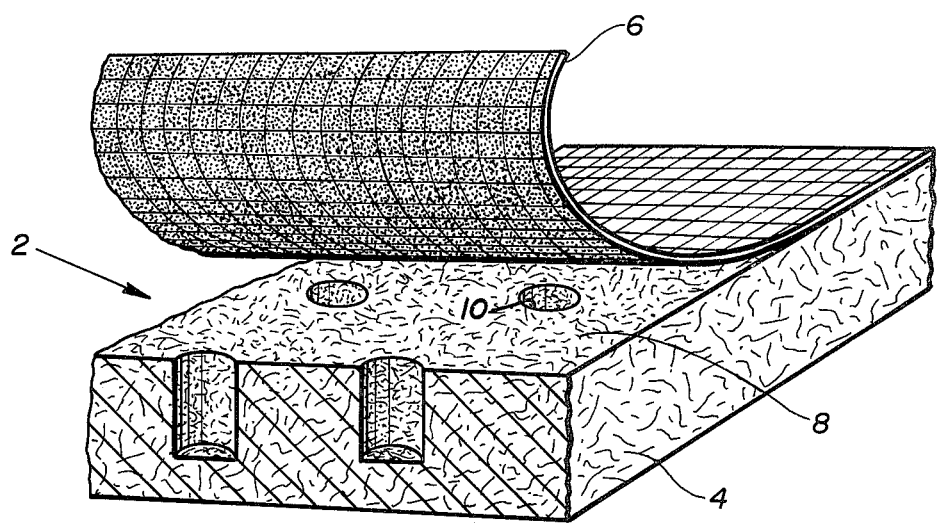
Figure 2:
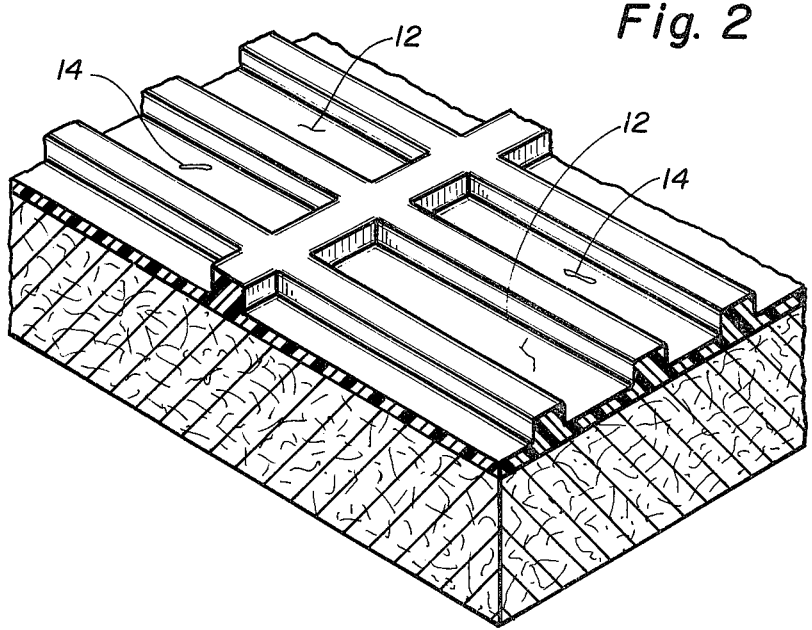

The acoustical sound absorbing structure 2 herein is composed of a base structure 4 and a facing layer 6. The base structure is a conventional rigid fibrous material ceiling board. The boards are normally formed about ¾" thick from either vegetable fiber or mineral fiber materials. The boards are formed by conventional water laid techniques and are then dried and provided with perforations. The primary purpose of the perforations is to increase the sound absorbing ability of the board. A standard rating system is provided for the purpose of measuring the sound absorbing ability of the board and this is generally referred to as the NRC rating of the board. The board 4 of FIG. 1 may be provided with uniformly distributed perforations having diameters of 0.075 inch or 0.102 inch. There are approximately 1,500 holes provided per square foot of board and this then gives you approximately ten holes per square inch. A typical board would be provided with 620 perforations of 0.102 inches and 930 perforations of 0.075 inches per square foot. Over the perforated surface 8 which has the perforations 10 therein, there is placed a facing sheet 6 which may be a vinyl material. A conventional vinyl material that can be utilized is a fabric back vinyl material sold by Columbus Coated Fabrics, A Division of Borden Chemical Company under the tradename Vinyl 7. This particular fabric is provided with an irregular surface which is referred to as design Gunny Type 1. An adhesive coating is provided on surface 8 for the purpose of bonding the facing sheet 6 to the base layer 4. The typical adhesive that may be utilized is the Franklin Adhesive #114 which is provided by the Franklin Chemical Company. The adhesive is provided at the rate of 11 to 15 grams per square foot and this amount of adhesive is sufficient to bond the Columbus coated fabric backed vinyl facing layer 6 to the conventional fiberboard structure 4.

Prior to the fastening of the facing layer 6 to the base layer 4, the vinyl sheet is pierced with a number of small apertures. Very small pins of 19 to 32 gauge steel, having a generally triangular configuration are used to pierce uniformly distributed holes in the vinyl sheet. The hole sizes range from 2½×3 mils to 13×14 mils. The holes are really slits in the sheet with no material removed from the sheet. The triangular pins tend to tear the fabric and vinyl structure to a slight extent and therefore there is not a uniformity of the apertures all to one set size, but they tend to range within the above size ranges given. In a typical piercing operation, approximately 200–400 apertures per square inch are provided in the vinyl sheet. Consequently, it can be seen that the apertures in the vinyl sheet are substantially smaller than the perforations in the fibrous base. The smallest aperture in the fiber base would be 0.075 inches and the largest aperture in the vinyl sheet would be a slit approximately 0.013×0.014 inch. Therefore, there is a size relation between the perforations in the base structure and the apertures of the vinyl sheet that would indicate that the apertures in the vinyl sheet are approximately one-fourth or less in area smaller than the perforations in the base sheet. Also, it should be noted that the perforations in the base sheet number approximately ten per square inch whereas the perforations in the vinyl sheet number close to 200–400 per square inch. Clearly this would support a recitation that the number of apertures in the vinyl sheets are 20 or more times in number per square inch greater than the number of perforations per square inch in the base structure. Since the perforations are uniformly spread over both the base structure and the vinyl sheet, it is clear that when the vinyl sheet is placed over the base structure a substantial number of the apertures in the vinyl sheet are not going to be in alignment with the perforations in the base sheet because of the size and distribution relationship of the two hole structures, and, that the perforations in the base sheet will have a substantial number of these perforations in alignment with the greatly increased number of apertures in the vinyl structure. In effect, the desired acoustical rating for the base structure is secured by the perforations in the base structure and all these perforations are fully utilized because of the large number of apertures in the vinyl sheet which pass sound through these apertures into almost all of the perforations in the base structure. An example of the finished product will not show a plurality of neat round holes in the surface of the vinyl. The tears or slits in the vinyl will partly close and what is seen is a number of narrow slits about 1 to 2 mils long and ½ to 1 mil wide. The slits up to 14 mils long appear as narrow line cracks in the surface of the vinyl. Therefore, the finished product has its apertures in the vinyl appearing as narrow line cracks 12 or small slits 14 of approximately 2 mils in length and 1 mil in width. The cracks and slits are visible only under magnification and are invisible to normal viewing.

What is claimed is:

1. A sound absorbing structure comprising in combination:
   (a) a fiber composition rigid baseboard having a plurality of large perforations in one face thereof;
   (b) a layer of fabric having an irregular outer surface contour forming the structure facing, adhered to and covering the perforated face of said baseboard; and
   (c) a fused resinous film covering said outer fabric layer and said film having an irregular surface contour, said resinous film and said fabric layer having multiple small sound emitting aperture means extending therethrough on the facing of the structure, a substantial number of said small irregular pierced aperture means being located in vertical alignment with each of the perforations in the base board, the remainder of said small aperture means being in non-alignment with the perforations in the base board, said aperture means being of such small size and appearing as narrow line cracks or narrow slits so that, being located in the irregular contoured surface of the film and fabric layers, the aperture means are substantially invisible at normal viewing distances while still providing improved sound absorption capabilities.

* * * * *